United States Patent [19]

Kikta et al.

[11] Patent Number: 5,166,627
[45] Date of Patent: Nov. 24, 1992

[54] METHOD AND APPARATUS FOR REMOTE TUBE CREVICE DETECTION BY CURRENT AND VOLTAGE PROBE RESISTANCE MEASUREMENT

[75] Inventors: Thomas J. Kikta; Ronald D. Mitchell, both of Pittsburgh, Pa.

[73] Assignee: The United States of America as represented by the United States Department of Energy, Washington, D.C.

[21] Appl. No.: 707,538

[22] Filed: May 30, 1991

[51] Int. Cl.$^5$ ............................. G01R 27/08
[52] U.S. Cl. ................... 324/718; 324/713; 324/715
[58] Field of Search ............ 324/691, 693, 697, 700, 324/713, 715, 716, 718

[56] References Cited

U.S. PATENT DOCUMENTS

| | | |
|---|---|---|
| 2,091,634 | 8/1937 | Greenslade et al. |
| 2,440,044 | 4/2048 | Greenslade. |
| 3,303,418 | 2/1967 | Rose. |
| 3,417,323 | 12/1968 | Williamson. |
| 3,500,188 | 3/1970 | Whitley. |
| 3,636,441 | 1/1972 | Fujimura et al. |
| 3,721,897 | 3/1973 | Edling. |
| 3,735,254 | 5/1973 | Sekevin ........................ 324/716 |
| 4,857,831 | 8/1989 | Davies et al. ................. 324/718 |

Primary Examiner—Gerard R. Strecker
Assistant Examiner—Diep Do
Attorney, Agent, or Firm—Michael P. Hoffman; William R. Moser; Richard E. Constant

[57] ABSTRACT

A method and apparatus for determining the extent of contact between an electrically conducting tube and an electrically conductive tubesheet surrounding the tube, based upon the electrical resistance of the tube and tubesheet. A constant current source is applied to the interior of the electrically conducting tube by probes and a voltmeter is connected between other probes to measure the voltage at the point of current injection, which is inversely proportional to the amount of contact between the tube and tubesheet. Namely, the higher the voltage measured by the voltmeter, the less contact between the tube and tubesheet.

5 Claims, 3 Drawing Sheets

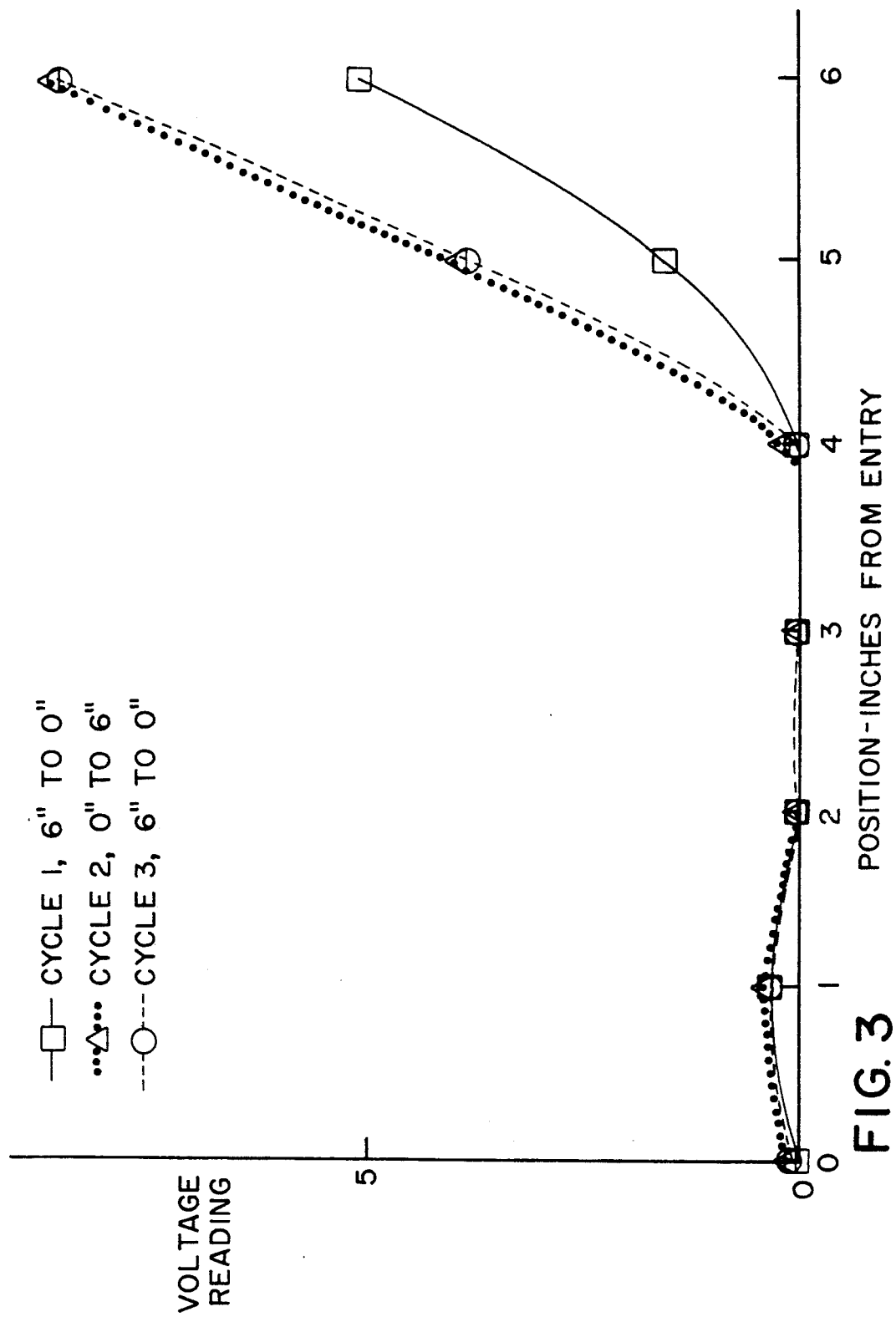

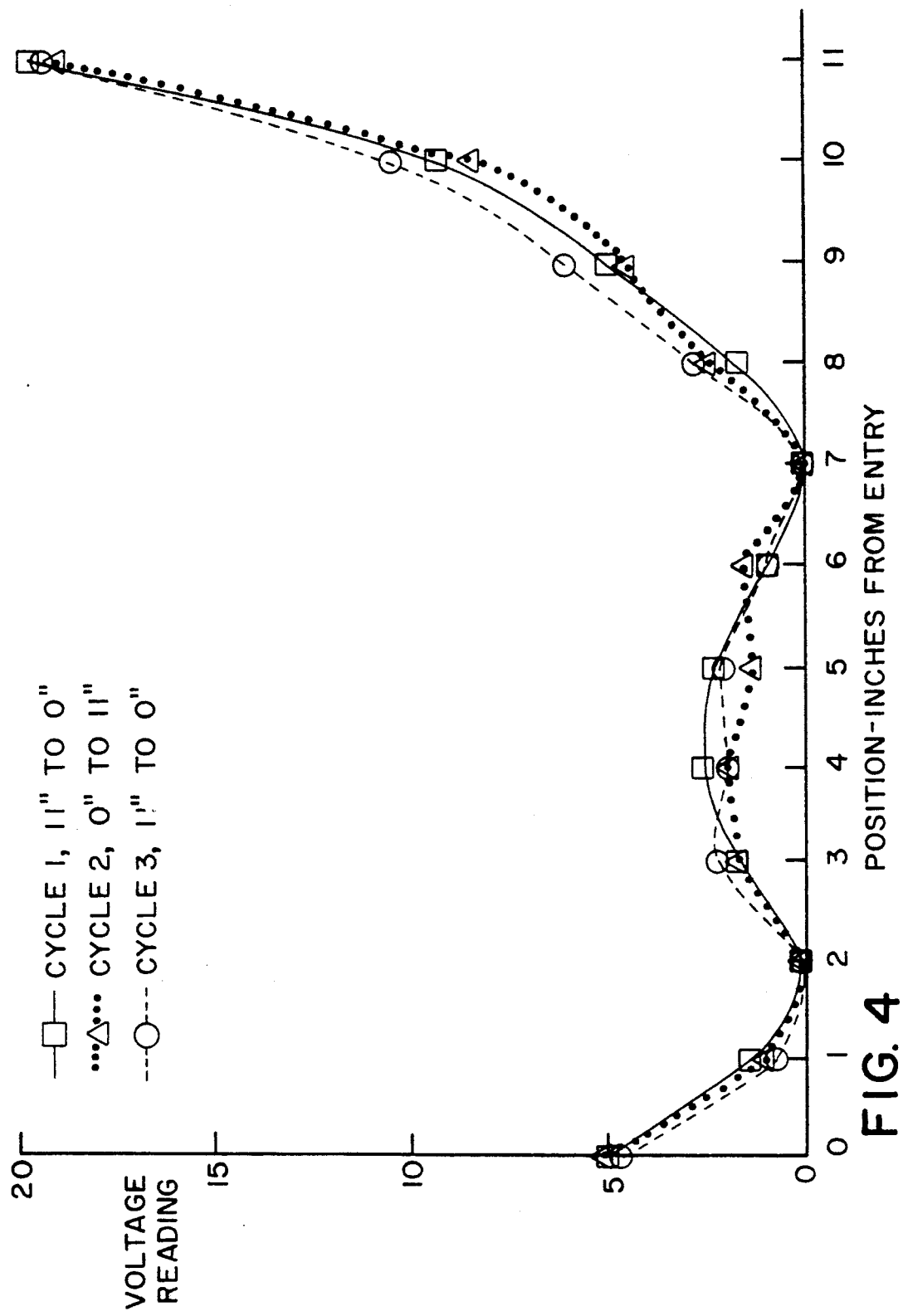

METHOD AND APPARATUS FOR REMOTE TUBE CREVICE DETECTION BY CURRENT AND VOLTAGE PROBE RESISTANCE MEASUREMENT

The U.S. Government has rights in this invention pursuant to Contract No. DE-AC11-76PN00014, awarded by the U.S. Department of Energy.

BACKGROUND OF THE INVENTION

This invention relates to a method and apparatus for providing a quantitative measure of the existence of a crevice or gap between an inner metallic tube and an outer, thick sheet of metal called a tubesheet and, more particularly, to the use of the principles of electricity based on Ohm's Law governing the passage of current through materials to obtain such quantitive measurements.

In the design of steam generators, the surface area for exchanging heat is maximized through the use of metal tubing as a barrier between the primary and secondary fluids used for heat exchange. The tubing can be assembled into a configuration and coupled to the primary fluid or coolant, so that the primary coolant can pass therethrough. The second fluid or coolant can be arranged about the outside of the tubing. The steam generator can be constructed of many lengths of tubing assembled in a bundle which connects to a source of heat. In such an assembly of tubing bundles, the ends of the tubing can pass through a thick sheet of metal, which can be called a tubesheet, which retains the tubing in position and forms a barrier between the primary and secondary fluids.

Generally, a heat exchanger is constructed by installing and fastening each tube into the tubesheet. For example, the ends of the tube can be inserted into pre-drilled holes in the tubesheet. The tubes can be expanded or "rolled" from the inside of the tube until the outside walls of the tubing make intimate contact with the walls of the tubesheet hole. The space between the tube and tubesheet must be closed to prevent the formation of a crevice between the tube and tubesheet which would promote corrosion.

In such a heat exchanger, it is important to assure that there is no gap or crevice, namely no space, between the tube and the tubesheet. An available technique for determining if the crevice or gap is closed (i.e., there is no space between the tube and tubesheet), is to measure the internal diameter of the tubing using Eddy Current Techniques. The gap is then inferred from the difference between the nominal size of the tubesheet hole and the measured internal diameter of the tube assuming the exact thickness of the tube wall is known. Thus:

*Crevice = Hole Diameter − (Tube Internal Diameter + Wall Thickness)*

The calculation must assume that all the tubesheet holes are of the same diameter and all of the tubing walls are of the same thickness. However, the thickness of the tubes and the inner diameter of the tubesheet holes are not constant because these values are subject to manufacturing variations which allow differences of several thousands of an inch. Accordingly, this technique can not assure that there is no gap between the tube and tubesheet hole, especially if there is a failure to fully expand the tube. For example, steam generators have been manufactured which have expansion differences of 0.003 to 0.016 inch.

SUMMARY OF THE INVENTION

It is an object of the present invention to provide an improved method and apparatus for determining if the outer wall of a metal tube is in intimate and complete contact with the inner wall of a surrounding metal tubesheet. This is achieved by means of applying a constant current through the tube and measuring the voltage across a combination of all the flow paths, where the voltage measured is an inverse function of the amount of contact of the tube with the tubesheet. The measurement is based upon Ohm's Law, where the resistance is an inverse measure of the amount of tube contact with the tubesheet. This single measurement can indicate the extent of the crevice or gap present between the tube and the tubesheet

BRIEF DESCRIPTION OF THE DRAWINGS

FIG. 3 shows three different plots where voltage readings were obtained from a properly expanded tube in a 4 inch tubesheet mockup.

FIG. 4 shows three different plots where voltage readings were obtained from an improperly expanded tube in a 10 inch tubesheet mockup.

DESCRIPTION OF PREFERRED EMBODIMENT

In the present invention, the operation of measuring tube contact with the tubesheet is based upon Ohm's Law governing the passage of current through the materials of the tube and tubesheet. The ease of current passing through metal is a function of the cross-sectional area of the path flow. For a fixed amount of applied electrical potential applied to a given length of material, the larger the cross-sectional area of the path, the less the resistance, and the greater the passage of current.

As stated by Ohm's Law, if the resistance to current is given by the symbol "R," for a fixed electrical potential of "E," the current "I" will flow through the material, namely:

$$I = E/R$$

Figure 1:
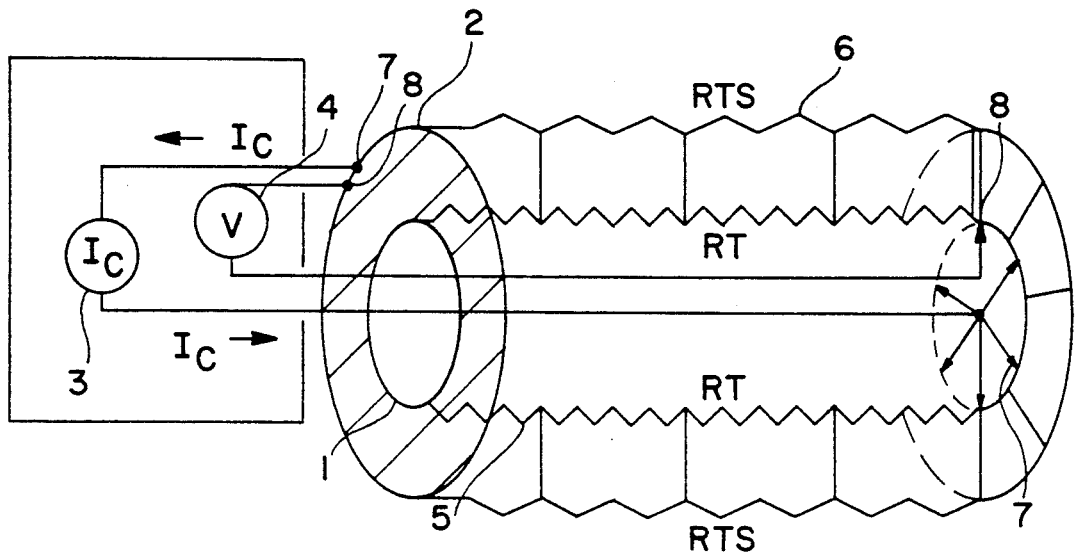
FIG. 1 is a graphic representation showing the metal tube retained within the tubesheet where the tube is in complete contact with the tubesheet.

Thus, if a fixed voltage is applied across the ends of the tubing having a constant cross-sectional area, a certain level of current will flow. If the cross-sectional area of the tube is increased by the application of tubesheet metal being in contact with the outer wall of the tube, the cross-sectional path available to current flow is increased and the flow of current will increase. A properly expanded tube contacting the tubesheet is depicted in FIG. 1, which shows additional flow paths around the resistance 5 of the installed tube 1. The alternate flow paths available through the tubesheet 2 cause a lower resistance 6 to be measured across the ends of the tube 1 through the tubesheet 2. For a given length of tubing properly expanded to make electrical contact with the tubesheet 2, the amount of contact to the tubesheet 2 is the inverse function of the electrical resistance. The greater the portion of the outside surface area of the tube 1 in contact to the material around the tube (i.e., tubesheet), the less resistance to the flow of current since the flow path of the current has an increased cross-sectional area by passing through both the tube 1 and tubesheet 2.

Due to space limitations inside the heat exchanger, the outside of the tube is not accessible for making measurements. However, it has been discovered that a similar measurement, as a measurement in accordance with the present invention, can be obtained from inside the tube. For example, as shown in FIG. 1, a practical method of measuring the amount of tube contact with the tubesheet can be obtained from inside the tube 1, when a constant current source 3 is used to force a fixed current through the tube 1. The voltage across the combination of flow paths is measured using a voltmeter 4. The voltage measured is an inverse function of the amount of contact of tube 1 with tubesheet 2.

Stated as an equation where Ic is a constant current, and where "E" equals voltage:

$$E = I_c \cdot R$$

The resistance (R) is a measure of the amount of tube contact with the tubesheet 2; the greater the contact, the lower the resistance.

Figure 2:
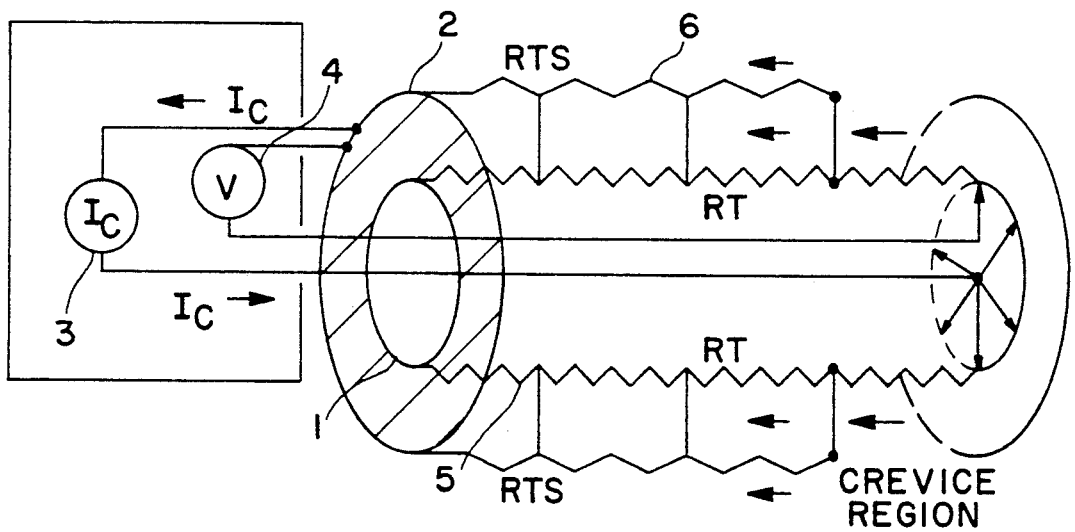
FIG. 2 is a graphic representation showing the metal tube retained within the tubesheet where the tube is not in complete contact with the tubesheet.

For example, by using suitable probes 7 connected to a constant current source 3, a fixed current can be passed through a section of the tube 1. The voltage measurement can be made at the point of current injection using suitable probes 8 connected to the voltmeter 4, as depicted in FIG. 1. The probes 7 and 8 can be positioned and rotated within the tube, as required. The current paths include those through the tubesheet 2 due to the lower resistance 6 to the flow of current, since there is greater cross-sectional area of current flow. Accordingly, the voltage measurement is made over a larger resistance path due to the higher resistance 5 of the tube by itself. As shown in FIG. 2, in the above equation for "E", at a constant current I°, the voltage E will be greater due to the higher resistance of the tube 1. Since there is incomplete tubesheet contact, the cross-section area of the tube 1 by contact with the tubesheet 2 is not increased and, therefore, the resistance is not lowered. In other words, there is no combination of both the resistance 5 of the tube 1 and the resistance 6 of the tubesheet 2, since the current will only flow through the tube 1 when the tube 1 is not in contact with tubesheet 2.

FIG. 3 shows three plots of a properly expanded tube 1 rolled into a 4 inch thick metal block simulating a tubesheet 2. The voltage and current probes were moved together at 1 inch increments along the interior of the tube expanded into the tubesheet mockups. The lower the voltage reading, the more tube 1 contact with the tubesheet 2. In FIG. 3, the low voltage readings indicate that the tube is properly expanded over the full thickness of the tubesheet. The repeated readings obtained with properly expanded tubes, applying the invention described herein, agree within 5%.

FIG. 4 shows three plots where a tube 1 was expanded improperly in a 10 inch thick tubesheet 2. The voltage measurements were made at one inch probe increments in a manner similar to that used in FIG. 3. Full expansion is observed in the 1 inch to 3 inch region and the 7 inch region over part of the circumference. Tube contact with the tubesheet was not found beyond the 7" region. The plot shows a middle slip of the expansion roller and a crevice (or gap) starting at about 3 inches from the entry point of the tubesheet 2. Direct data readings for the entire tubesheet 2 were taken in approximately one minute. The readings observed with the partially or improperly expanded tubes measure voltages which are at least a factor of two greater than the voltages measured with fully expanded tubes in FIG. 3. Thus, it is readily apparent that the present invention can easily detect a gap or space between the tube and tubesheet.

The measuring technique apparatus and method of the present invention can be used in manufacturing during tube expansion, used after the tube expansion is performed, and can also be used to evaluate steam generators in service for crevice development. The voltage measurement is inversely proportional to the extent that the periphery of the tube 1 is in contact with the tubesheet 2, and the depth of the crevice from the secondary end of the tubesheet hole. The measurement can be made with a hand-held instrument which provides direct digital reading proportional to the crevice length without further calculations or interpretations. Alternatively, the measurements can be automated using multiple tip probes and computerized data collection.

What is claimed is:

1. A method of remotely determining an amount of contact between an outer wall of an electrically conducting tube and the inner wall of an electrically conductive tubesheet surrounding said tube comprising:

applying a fixed constant current to said tube and tubesheet between a first pair of probes contacting the inner wall of said tube and the outer wall of tubesheet measuring a voltage across said tube and tubesheet using a second pair or probes contacting the inner wall of said tube and the outer wall of said tubesheet and remotely determining the amount of contact between said outer wall of said tube and said inner wall of said tubesheet as a function of changes in the voltage due to increased or decreased resistance, wherein one each of said first pair of probes and said second pair of probes at one end of said tube and tubesheet and one each of the other of said first pair of probes and said second pair of probes is positioned at an equal length from said one end of said tube and tubesheet 2.

2. The method of claim 1, wherein said measured voltage increases in an amount proportional to length of gap between said tube and tubesheet.

3. The method of claim 1, wherein said equal length is varied and a plurality of measurements of voltage between said second pair of probes is obtained at each said equal length from said one end of said tube.

4. The method of claim 1, wherein measurement of said voltage displays an inverse relationship to said amount of contact between said tube and said tubesheet at each position of measurement.

5. The method of claim 3, wherein said fixed constant current is applied at equal lengths inside said tube and said voltage measurements are taken at said equal lengths where the said fixed constant current is applied.

* * * * *